United States Patent
Hebison

(10) Patent No.: US 9,681,608 B2
(45) Date of Patent: Jun. 20, 2017

(54) NON-INVASIVE SPRINKLER

(71) Applicant: Christopher Hebison, Cedar Park, TX (US)

(72) Inventor: Christopher Hebison, Cedar Park, TX (US)

(*) Notice: Subject to any disclaimer, the term of this patent is extended or adjusted under 35 U.S.C. 154(b) by 0 days.

(21) Appl. No.: 15/044,915

(22) Filed: Feb. 16, 2016

(65) Prior Publication Data

US 2016/0157442 A1   Jun. 9, 2016

Related U.S. Application Data

(63) Continuation of application No. 13/936,184, filed on Jul. 6, 2013, now Pat. No. 9,288,950.

(51) Int. Cl.
| | | |
|---|---|---|
| *F16K 31/08* | (2006.01) | |
| *A01G 25/00* | (2006.01) | |
| *B05B 15/10* | (2006.01) | |

(52) U.S. Cl.
CPC .............. *A01G 25/00* (2013.01); *B05B 15/10* (2013.01); *F16K 31/08* (2013.01)

(58) Field of Classification Search
CPC ............................ F16K 31/0624; F16K 31/08
USPC .................. 251/65, 129.11, 129.15; 239/201
See application file for complete search history.

(56) References Cited

U.S. PATENT DOCUMENTS

| | | | |
|---|---|---|---|
| 3,071,340 A | 1/1963 | Nixon | 251/65 |
| 3,212,751 A | 10/1965 | Hassa | |
| 4,235,414 A | 11/1980 | Lis | |
| 4,750,705 A * | 6/1988 | Zippe | F16K 31/003 137/248 |
| 5,052,429 A * | 10/1991 | Yoo | F16K 17/366 137/38 |
| 5,282,281 A | 2/1994 | Clear et al. | |
| 5,284,316 A | 2/1994 | Chen | 251/65 |
| 6,199,587 B1 | 3/2001 | Shlomi et al. | |
| 6,517,045 B1 * | 2/2003 | Northedge | F16K 31/082 251/129.16 |
| 7,562,399 B2 | 7/2009 | Parsons et al. | |
| 8,215,335 B2 | 7/2012 | Barnham | |
| 8,302,932 B2 | 11/2012 | Bakke et al. | |
| 8,307,906 B2 | 11/2012 | Reilly et al. | |
| 2009/0032238 A1 * | 2/2009 | Rogers | E21B 34/066 166/66.6 |
| 2011/0163249 A1 | 7/2011 | Meikle et al. | |
| 2012/0126028 A1 | 5/2012 | Nations | |
| 2013/0026041 A1 | 1/2013 | Huh | |

* cited by examiner

*Primary Examiner* — Arthur O Hall
*Assistant Examiner* — Tuongminh Pham
(74) *Attorney, Agent, or Firm* — Pierson IP, PLLC

(57) ABSTRACT

Embodiments disclosed herein provide systems and methods for an in-ground sprinkler to controller a liquid flow rate through a chamber, while reducing or eliminating leakage. Embodiments may utilize a flat, external surface that is configured to be flush with a ground surface to control the liquid flow rate through the in-ground sprinkler. In embodiments, a permanent magnet may be positioned on the flat, external surface to control an internal patch system. Responsive to the permanent magnet controlling the internal patch, liquid flowing through the chamber may be controlled.

20 Claims, 6 Drawing Sheets

NON-INVASIVE SPRINKLER

CROSS-REFERENCE TO RELATED APPLICATIONS

This application is a continuation of and claims a benefit of priority under 35 U.S.C. §119 to U.S. patent application Ser. No. 13/936,184 filed Jul. 6, 2013, which is hereby fully incorporated herein by reference in its entirety.

BACKGROUND INFORMATION

Field of the Disclosure

The present disclosure relates generally to systems and methods for reducing leaks and controlling water flowing in and through in-ground sprinkler systems. In particular, examples of the present disclosure are related to a non-invasive, in-ground sprinkler system, where valves do not extend into a sealing surface and the sealing surface is internally covered.

Background

Conventional in-ground sprinklers are commonly used in commercial irrigation systems, particularly golf courses. In-ground sprinklers are commonly installed coupled to underground water supply lines that supply water to the in-ground sprinklers. The in-ground sprinklers have pop-up sprinklers that are contained in cylindrical housings.

Conventional in-ground sprinklers are configured to output water in a desired area that may be a circular arc. Conventionally to control the output of water, manually turning on, or turn off the sprinkler, controls positioned on a top surface of the in-ground sprinkler are adjusted.

Responsive to adjusting the controls on the top surface of the in-ground sprinkler, valves are opened or closed, via valve stem which extends through the body of the valve. An O-ring around the stem usually seals off the water pressure from outside the valve body. However, repositioning the valve through the body of the valve causes friction between the valve stem and the sealing surface (O-ring), which over time causes leaks. The controls positioned on the top surface of the in-ground sprinkler are subject to wear and contact from machinery operating on the ground surface, such as lawn mowers, weed whackers, etc. The machinery may cause contacts of the controls to become worn down and inoperable. The machinery may also cause the controls to move the valves away from the internal or external sealing surface, causing leaks.

Conventional in-ground sprinklers may also utilize patches that are positioned on an external surface of a sealing surface. Responsive to adjusting the controls positioned on the top surface of the in-ground sprinkler, the patch may be moved towards the sealing surface to stop water flow. However, water pressure may cause the external patch to not be flush with the sealing surface, which may cause leaks. Furthermore, continuous energy is needed to be applied to the external patch to counteract the internal water pressure.

Accordingly, needs exists for more efficient and effective in-ground sprinkler systems that reduces leakage by eliminating valve stems, reduces the number of sealing surfaces within a chamber, and utilizes internal water pressure and a permanent magnet to control a patch to open and close an internal sealing surface.

SUMMARY

Embodiments disclosed herein provide systems and methods for an in-ground sprinkler that controls a liquid flow rate through a chamber, while reducing or eliminating leakage. Embodiments may utilize a flat, external surface that is configured to be flush with a ground surface to control liquid output from the chamber. The flat, external surface may not include indentations, ridges, or depressions configured to receive tools to control the water output from the in-ground sprinkler. Therefore, machinery operating over the in-ground sprinkler may not break, wear, or impair the controls positioned on the top surface of the in-ground sprinkler. Additionally, since most golf courses utilize hundreds of sprinklers, needs exist to be able to operate a plurality of sprinklers with the same permanent magnet. The ability to turn on a sprinkler, remove the magnet, and turn on others as well is desired.

In embodiments, adjusting the liquid pressure within a chamber, adjusting the arc of the sprinkler, or manually turning on or off the in-ground sprinkler may not disturb the water-tight integrity of the chamber. In embodiments, the water-tight integrity of the valve body may also be maintained utilizing a permanent magnet to control liquid flowing through the chamber. The permanent magnet may be utilized to adjust the liquid flowing into an outlet port of the in-ground sprinkler, the angle of distribution of liquid from the in-ground sprinkler, and/or the liquid distribution pattern of the in-ground sprinkler.

In embodiments, the in-ground sprinkler system may include a chamber, a permanent magnet, an inlet port, an outlet port, an internal sealing surface, and an internal patch. Responsive to the inlet port supplying liquid to fill the chamber, the liquid pressure within the chamber may cause the internal patch to be flush against the internal sealing surface of the outlet port. Once the patch is flush against the internal sealing surface of the outlet port, the chamber may be filled with liquid supplied by the inlet port.

In embodiments, the permanent magnet may be configured to be positioned at a top, external surface of the chamber. Responsive to moving the permanent magnet along the top surface of the chamber on a horizontal plane, the permanent magnet may cause the patch to move away from the sealing surface allowing liquid within the chamber to flow into the output port.

In embodiments, responsive to removing the permanent magnet from the top surface of the chamber, the liquid pressure within the chamber may cause the patch to move to a position flush with the internal sealing surface of the outlet port to eliminate liquid entering the outlet port.

In embodiments, responsive to moving the permanent magnet to a certain area along the top surface of the valve, the patch remains away from the outlet port. Removal of the permanent magnet does not cause the patch to close off the outlet port. The patch may be moved back to a place adjacent to the outlet by the permanent magnet at a later time to close off the outlet port. Such cases are desired or required when there is a power outage and multiple sprinklers need to be running simultaneously using a single permanent magnet.

In embodiments, the patch may be positioned within the chamber and be configured to cover the internal sealing surface of the outlet port without extending into or through the internal sealing surface. Therefore, wear between the internal sealing surface and the patch may be reduced or eliminating and the patch may prevent, reduce, or eliminate leaks within the in-ground sprinkler system.

Embodiments may reduce or eliminate the need for external patches or external sealing surfaces on the chamber that may be disrupted when controlling liquid flowing through the chamber.

In embodiments, by utilizing a permanent magnet, electricity may not be required to control the liquid flowing through the chamber. Furthermore, embodiments of the in-ground sprinkler may be retrofitted to existing in-ground sprinkler systems to control the liquid flowing through the existing in-ground sprinkler.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Figure 1:
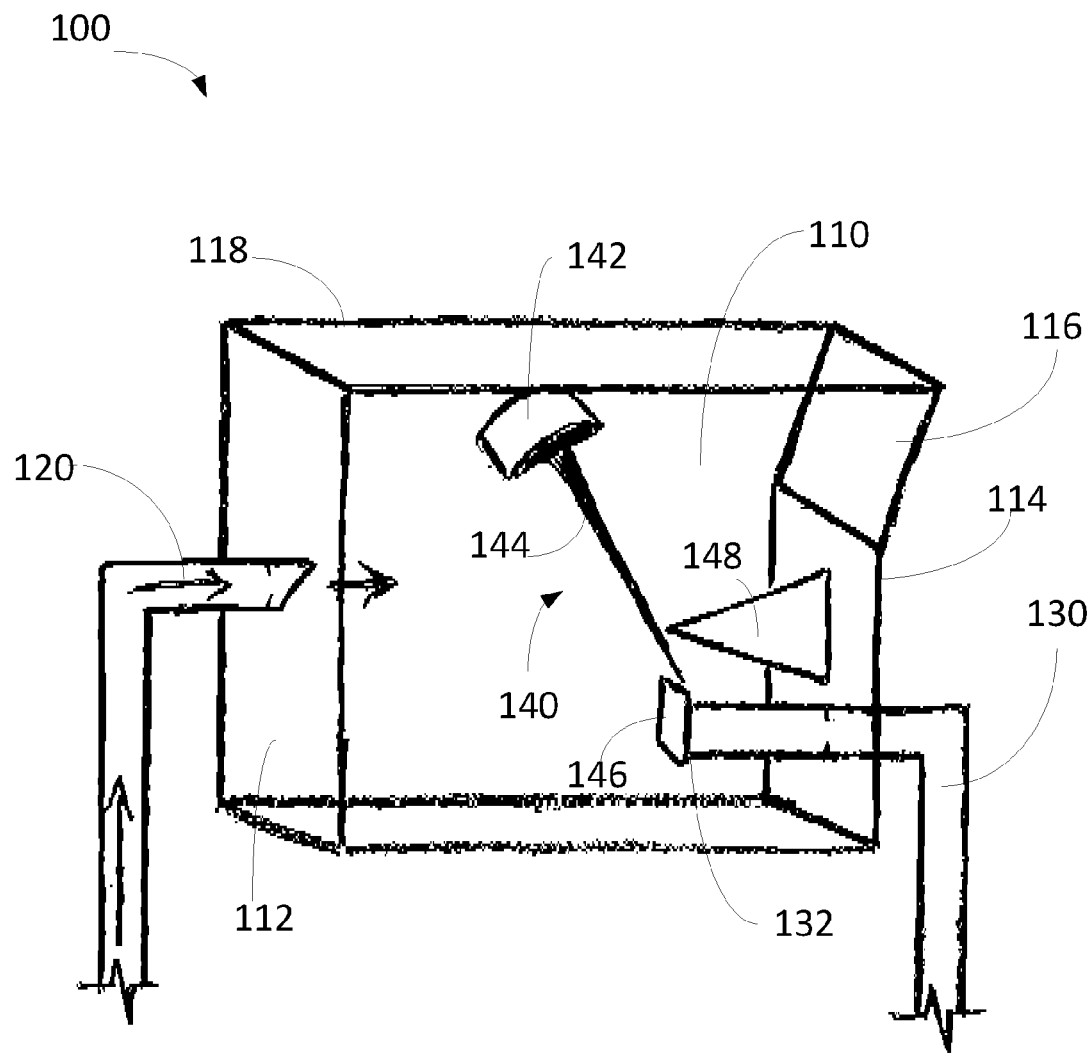
FIG. 1 depicts an embodiment of an in-ground sprinkler system.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

The invention and the various features and advantageous details thereof are explained more fully with reference to the nonlimiting embodiments that are illustrated in the accompanying drawings and detailed in the following description. Descriptions of well-known starting materials, processing techniques, components and equipment are omitted so as not to unnecessarily obscure the invention in detail.

It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure.

As used herein, the terms "comprises," "comprising," "includes," "including," "has," "having" or any other variation thereof, are intended to cover a non-exclusive inclusion. For example, a process, article, or apparatus that comprises a list of elements is not necessarily limited to only those elements but may include other elements not expressly listed or inherent to such process, article, or apparatus.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example," "for instance," "e.g.," "in one embodiment."

The flowchart and block diagrams in the flow diagrams illustrate the architecture, functionality, and operation of possible implementations of systems or methods according to various embodiments of the present invention. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware. In further embodiments, the block diagrams and/or flowchart illustrations, and combinations of blocks in the block diagrams and/or flowchart illustrations, may be implemented by special purpose computer program instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

Embodiments disclosed herein provide systems and methods for an in-ground sprinkler configured to control the flow rate of a liquid being dispensed from the in-ground sprinkler, while reducing or eliminating leakage. In embodiments, the liquid being dispensed may be water, fertilizer, and/or any other liquid product that may be used to maintain plants on the ground surface.

Embodiments may utilize a flat, external surface that is configured to be flush with the ground surface to control the liquid output from the in-ground sprinkler. The flat, external surface may not include indentations, ridges, or depressions. In embodiments, a permanent magnet may be utilized to control a patch disposed internally within a chamber. Responsive to the permanent magnet controlling the position of the internal patch within the chamber, liquid flowing through the chamber may be controlled.

Turning now to FIG. 1, FIG. 1 depicts one embodiment of an in-ground sprinkler system 100. In-ground sprinkler system 100 may include a chamber 110, an inlet port 120, an outlet port 130, and internal patch system 140.

Chamber 110 may be any receptacle, container, or structure configured to hold a liquid. In embodiments, chamber 110 may be a unified structure to limit, reduce, or limit leakage of the liquid from chamber 110. In embodiments, chamber 110 may be comprised of a non-ferrous material, including rubber, silicone, phthalate-free PVC, plastics, woods, fabrics, etc. Chamber 110 may include a first side wall 112, a second side wall 114, projection 116, and a top surface 118. In embodiments, first side wall 112, second side wall 114, and projection 116 may be configured to be positioned in-ground. Therefore, an outer surface of first side wall 112, second side wall 114, and projection 116 may be encompassed, surrounded, or walled by the ground.

In embodiments, an external face of top surface 118 may be configured to be flush and/or parallel to a top surface of the ground. Top surface 118 may be a unified, flat sheet, which does not include projections, indentations, or depressions. Top surface 118 may extend from first side wall 112 to projection 116 in parallel to the surface of the ground.

Disposed on first side wall 112 of in-ground sprinkler system 100 may be inlet port 120. Inlet port 112 may be tubular in shape with a hollow interior surface. Inlet port 120 may be configured to receive liquid from a feed valve, pilot tube, etc. to transport the liquid through the tube, and place the liquid within the interior of chamber 110. In embodiments, inlet port 120 may be comprised of a non-ferrous material, including rubber, silicone, phthalate-free PVC, plastics, woods, fabrics, etc. In embodiments, inlet port 120 may be disposed at a position closer to top surface 118 than outlet port 130. Therefore, if internal patch system 140 is in an open position allowing liquid to flow into outlet port 130, liquid may be continuously displaced into chamber 110 to flow into outlet port 130.

Disposed on second sidewall 112 of in ground sprinkler system 100 may be outlet port 130. Outlet port 130 may be tubular in shape with a hollow interior surface, and a sealing surface 132 positioned internally within chamber 110. Outlet port 130 may be configured to receive liquid within chamber 110 at sealing surface 132, transport the liquid through the tube, and output the liquid. Outlet port 130 may be comprised of a non-ferrous material, including rubber, silicone, phthalate-free PVC, plastics, woods, fabrics, etc. In embodiments, outlet port 130 may be configured to extend inwards into chamber 110. Outlet port 130 may extend into chamber 110 so that sealing surface 132 of chamber 110 is not disposed on a sidewall of chamber 110. Furthermore, outlet port 130 may extend inwards into chamber 110 such that sealing surface 132 may receive a portion of internal patch system 140 to cover sealing surface 132 of outlet port. In embodiments, outlet port 130 may be positioned at a position further from top surface 110 than inlet port 120.

Projection 116 may be configured to extend from an upper surface of second sidewall 114 to top surface 118. Projection 116 may be angled outward from an inner surface of chamber 110, such that projection 116 increases the volume of chamber 110. In embodiments, if internal patch system 140 is in a closed position no portion of internal patch system 140 may be disposed within projection 116, and if internal patch system 140 is in an open position, a portion of internal patch system 140 may be disposed within projection 116.

Internal patch system 140 may be configured to be coupled internally to second side wall 114. In embodiments, internal patch system 140 may include a metal element 142, shaft 144, patch 146, and fulcrum 148.

Metal element 142 may be comprised of metal, such as steel, iron, or any other material that is configured to be moved by a permanent magnet, and will not corrode, rust, deteriorate, etc. when disposed in a liquid. Metal element 142 may be configured to be positioned internally within chamber 110 in close proximity to an internal face of top surface 118. In embodiments, metal element 142 may be configured to be positioned such that an external magnet positioned on the external face of top surface 118 may be pulled or attracted to the external magnet. The external magnet may pull metal element 142 such that metal element 142 may move in an arc in a direction corresponding to a face of top surface 118. In embodiments, metal element 142 may be configured to move in a direction in parallel to the face of top surface 118 and perpendicular to second sidewall 114.

Metal element 142 may be configured to couple with a first end of shaft 144. Shaft 144 may be comprised a non-ferrous material, including rubber, silicone, phthalate-free PVC, plastics, woods, fabrics, etc. Shaft 144 may be configured to extend away from top surface 118 of chamber 110 towards a bottom surface of chamber 110. Shaft 144 may be configured to control the movement of metal element 142 and patch 146 within chamber 110. In embodiments, shaft 144 may control the movement of metal element 142 and patch 146, such that if metal element 142 is positioned closer to first side wall 112 patch 146 may be positioned closer to second side wall 114, and if metal element 142 is positioned closer to second side wall 114 patch 146 may be positioned closer to first side wall 112. In embodiments, the first end of shaft 144 may be positioned closer to top surface 118 than inlet port 112, and the second end of shaft 144 may be positioned closer to a bottom surface of chamber 100 than inlet port 112. In embodiments, a middle portion of shaft 144 may be coupled to fulcrum 148 and a second end of shaft 144 may be coupled to patch 146.

Fulcrum 148 may be configured to couple with a middle portion of shaft 144 and second side wall 114. Fulcrum 148 may couple with shaft 144 to create a point or surface where shaft 144 may pivot or rotate about. In embodiments, fulcrum 148 may be disposed at a position along second side wall 114 that is closer to top surface 118 than outlet port 130. In embodiments, fulcrum 148 may also extend inward towards the center of chamber 110 to a position closer to the center of chamber 110 than sealing surface 132 of outlet port 130, while in other embodiments the pivot point of fulcrum 148 may be positioned along the same plane as sealing surface 132 of outlet port 130. Fulcrum 148 may be comprised a non-ferrous material, including rubber, silicone, phthalate-free PVC, plastics, woods, fabrics, etc.

Patch 146 may be configured to be disposed internally within chamber 110 and coupled to the second end of shaft 144. In embodiments, patch 146 may be configured to shaped and/or sized to cover sealing surface 132 of outlet port 130. If patch 146 is positioned adjacent to sealing surface 132, patch 146 may be flush against sealing surface 132 and not allow liquid to enter outlet port 130. Patch 146 may be configured to cover sealing surface 132 without extending into or through sealing surface 132. Therefore, the integrity of sealing surface 132 and outlet port 140 may not be disrupted via controlling water flow through chamber 110, which may reduce leaks.

The position of patch 146 may be configured to be controlled by a permanent magnet positioned on the external face of chamber 110. In embodiments, when the permanent magnet pulls metal element 142, patch 146 may be configured to move towards or away from sealing surface 132. For example, if the external permanent magnet pulls metal element 142 in a first direction, patch 146 may move in a second direction away from sealing surface 132 in an arc in a direction corresponding to a face of top surface 118. In embodiments, patch 146 may be configured to move in a direction in parallel to the face of top surface 118. Further, if external magnet is removed from top surface 118, the internal liquid pressure within chamber 110 may move patch 146 in the first direction towards sealing surface 132, and metal element 142 may move in the first direction away from second side wall 114. Accordingly, liquid flowing through chamber 110 may be controlled via patch 146 disposed internally within chamber 110, the internal liquid pressure within chamber 110, and an external permanent magnet. Therefore, chamber 110 may not utilize, require, or desire patches or valve stems to be disposed through or on a sealing surface on the exterior of chamber 110, patches or valve stems that move in a vertical direction, and/or patches or valve stems positioned externally from chamber 110.

Figure 2:
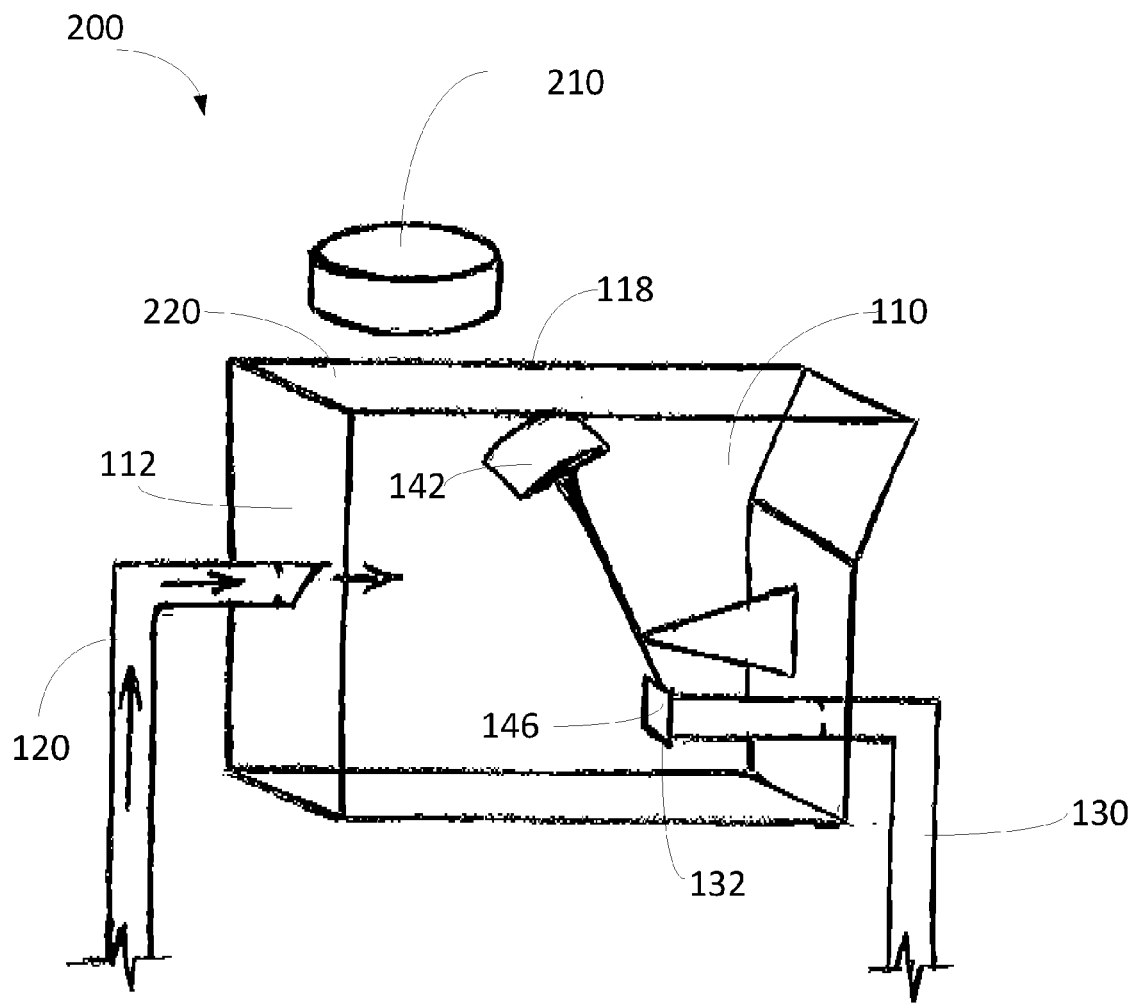
FIG. 2 depicts an embodiment of an in-ground sprinkler system.

FIG. 2 depicts one embodiment of in-ground sprinkler system 200 where liquid flowing through chamber 110 is controlled via permanent magnet 210. In-ground sprinkler system may include elements that are the same as or similar to elements depicted in in-ground sprinkler system 100, in accordance with one or more implementations.

Permanent magnet 210 may be a magnet that is comprised of a material that produces a persistent magnetic field, such as steal, iron, nickel, etc. The persistent magnetic field generated by permanent magnet 210 may be configured to pull or push magnetic element 142 disposed internally within chamber 110. In embodiments, permanent magnet 210 may be configured to be positioned on the external face of top surface 118, which may be level to the ground surface. By top surface 118 having a flat external face that is configured to be flush with the ground surface, permanent magnet 210 may be disposed on various positions on the external face to control the liquid output from in-ground sprinkler system 200. Therefore, machinery operating over the in-ground sprinkler may not break, wear, or impair an interface positioned on the external face of top surface 118 of in-ground sprinkler 200 to control liquid output from sprinkler system 200.

As depicted in FIG. 2, permanent magnet 210 may be positioned on a first side 220 of top surface 118. If permanent magnet is positioned on first side 220, patch 146 may be configured to internally cover sealing surface 132 of outlet port 130. As sealing surface 132 is covered by patch 146, liquid supplied from inlet port 120 may fill chamber 110. The liquid supplied from inlet port 120 may enter chamber 110 in a direction that is perpendicular to first sidewall 112. Responsive to chamber 110 being filled with liquid, the internal liquid pressure within chamber 110 may cause patch 146 to cover sealing surface 132 without permanent magnet being disposed on top surface 118.

Figure 3:
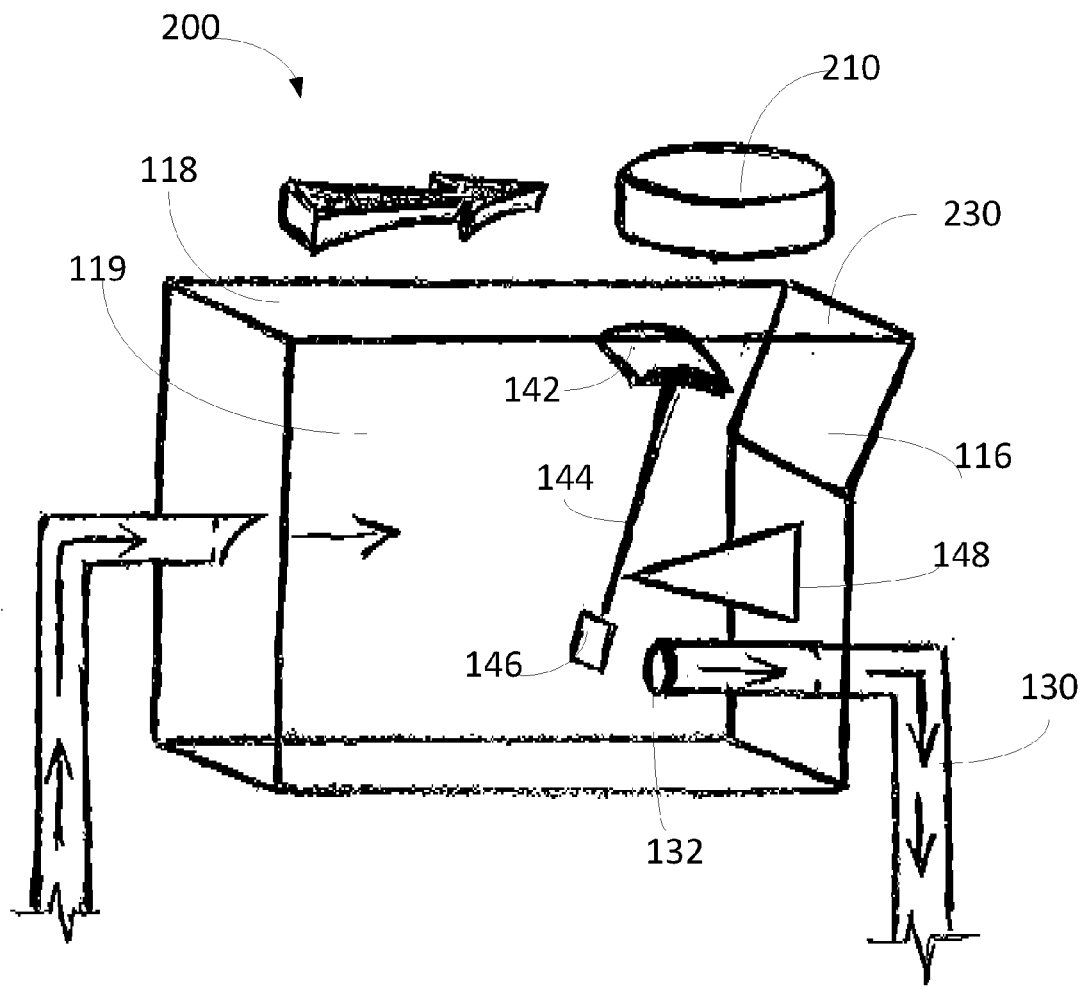
FIG. 3 depicts an embodiment of an in-ground sprinkler system.

FIG. 3 depicts one embodiment of in-ground sprinkler system 200 where liquid flowing through chamber 110 is controlled via permanent magnet 210. In-ground sprinkler system may include elements that are the same as or similar to elements depicted in in-ground sprinkler system 200, in accordance with one or more implementations.

As depicted in FIG. 3, permanent magnet 210 may be positioned on a second side 230 of top surface 118. Permanent magnet 210 may generate a magnetic field configured to pull metal element 142 within chamber 110, and dispose a portion of metal element within projection 116. Responsive to permanent magnet 210 pulling metal element 142, shaft 144 may rotate or pivot about fulcrum 148 and pull patch 146 in a direction substantially perpendicular to outlet port 130 to uncover sealing surface 132. In response to sealing surface 132 no longer being covered by patch 146, liquid may flow from chamber 110 into outlet port 130.

In embodiments, if permanent magnet 210 is removed from top surface 118, the internal liquid pressure within chamber 110 may cause patch 146 to cover sealing surface 132 to restrict water flowing through outlet port 130.

In further embodiments, a spring (not shown) may be coupled to second sidewall 114 to assist in the movement of patch 146. As permanent magnet 210 moves patch 146 away from sealing surface 132, the liquid pressure within chamber 110 may release a load to the spring, causing the spring to be elongated. If permanent magnet 210 is removed from top surface 118, the load may be applied to the spring, compressing the spring.

Figure 4:
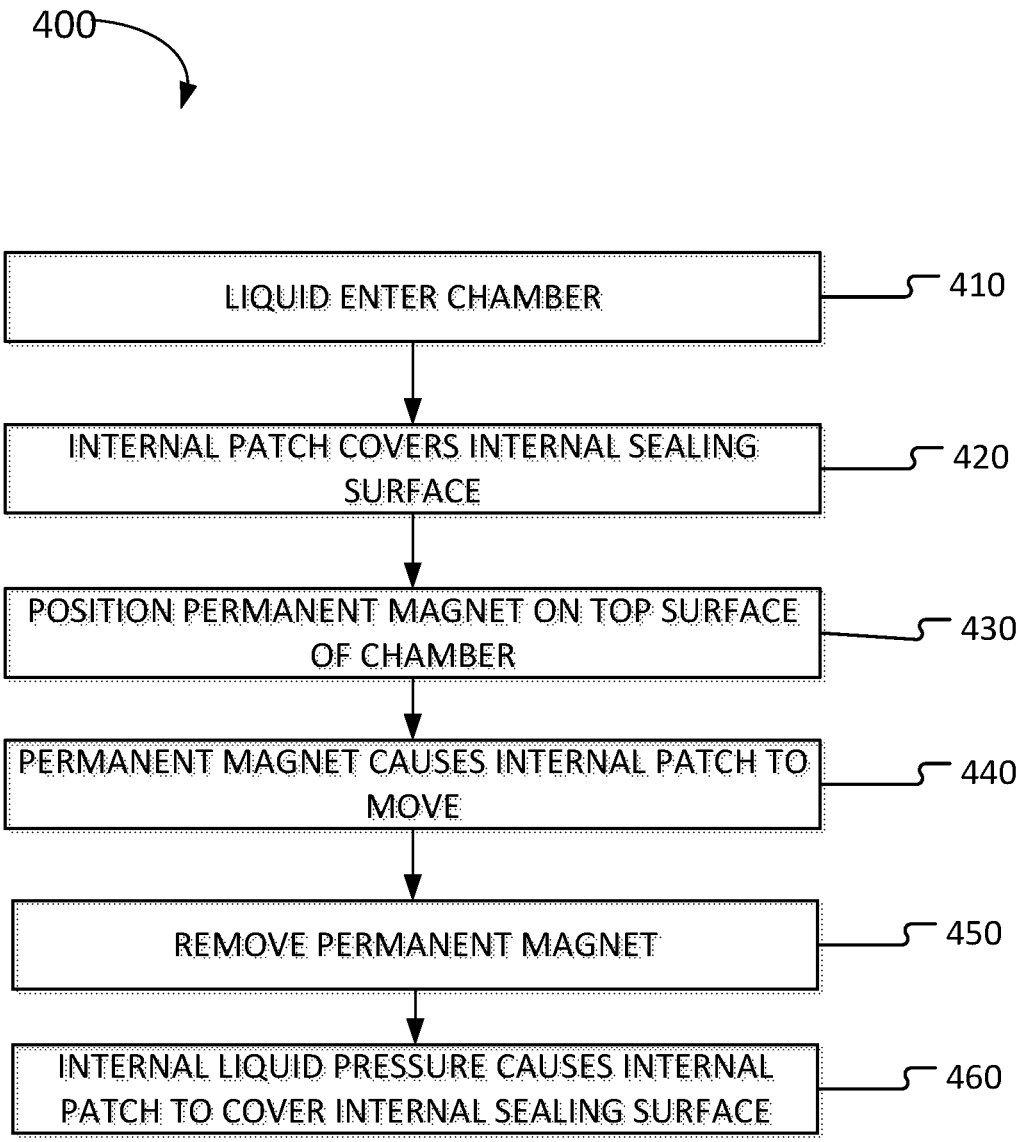
FIG. 4 illustrates an embodiment of a method for controlling an in-ground sprinkler system via a permanent magnet.

FIG. 4 illustrates a method 400 for utilizing a permanent magnet to control liquid output from an in-ground sprinkler. The operations of method 400 presented below are intended to be illustrative. In some embodiments, method 400 may be accomplished with one or more additional operations not described, and/or without one or more of the operations discussed. Additionally, the order in which the operations of method 400 are illustrated in FIG. 4 and described below is not intended to be limiting.

At operation 410, liquid may enter a chamber of the in-ground sprinkler via an inlet port. The liquid may enter the chamber until the chamber is filled with the liquid. Operation 410 may be performed by utilizing an inlet port and chamber that are the same as or similar to inlet port 120 and chamber 110, in accordance with one or more implementations.

At operation 420, responsive to the chamber being filled with the liquid, the internal pressure of the liquid within the chamber may cause an internal patch to be positioned flush against a sealing surface on an internal sidewall of an outlet port of the chamber. Operation 420 may be performed by utilizing an internal patch system that is the same as or similar to internal patch system 140, in accordance with one or more implementations.

At operation 430, a permanent magnet may be positioned on an external, top surface of the chamber, where the external, top surface of the chamber may be flush with a surface of the ground. Operation 430 may be performed by utilizing a permanent magnet that is the same as or similar to permanent magnet 200, in accordance with one or more implementations.

At operation 440, responsive to the placement of the permanent magnet on the external, top surface of the chamber, the magnetic field of the permanent magnet may cause the internal patch system to move away from the sealing surface on the internal sidewall of the chamber. In response to the internal patch being moved away from the sealing surface, liquid within the chamber may flow into the outlet port. Operation 440 may be performed by utilizing an internal patch system that is the same as or similar to internal patch system 140, in accordance with one or more implementations.

At operation 450, the permanent magnet may be removed from the external, top surface of the chamber. Operation 450 may be performed by utilizing a permanent magnet that is the same as or similar to permanent magnet 200, in accordance with one or more implementations.

At operation 460, responsive to the permanent magnet and corresponding magnetic field being removed, the internal liquid pressure within the chamber may cause the internal patch system to move and cover the internal sealing surface of the chamber. By covering the sealing surface on the interior of the chamber, the internal patch system may utilize the liquid pressure within the chamber to cover the outlet port to reduce or eliminate leakage of the liquid from the chamber. Operation 460 may be performed by utilizing an internal patch system that is the same as or similar to internal patch system 140, in accordance with one or more implementations.

Figure 5:
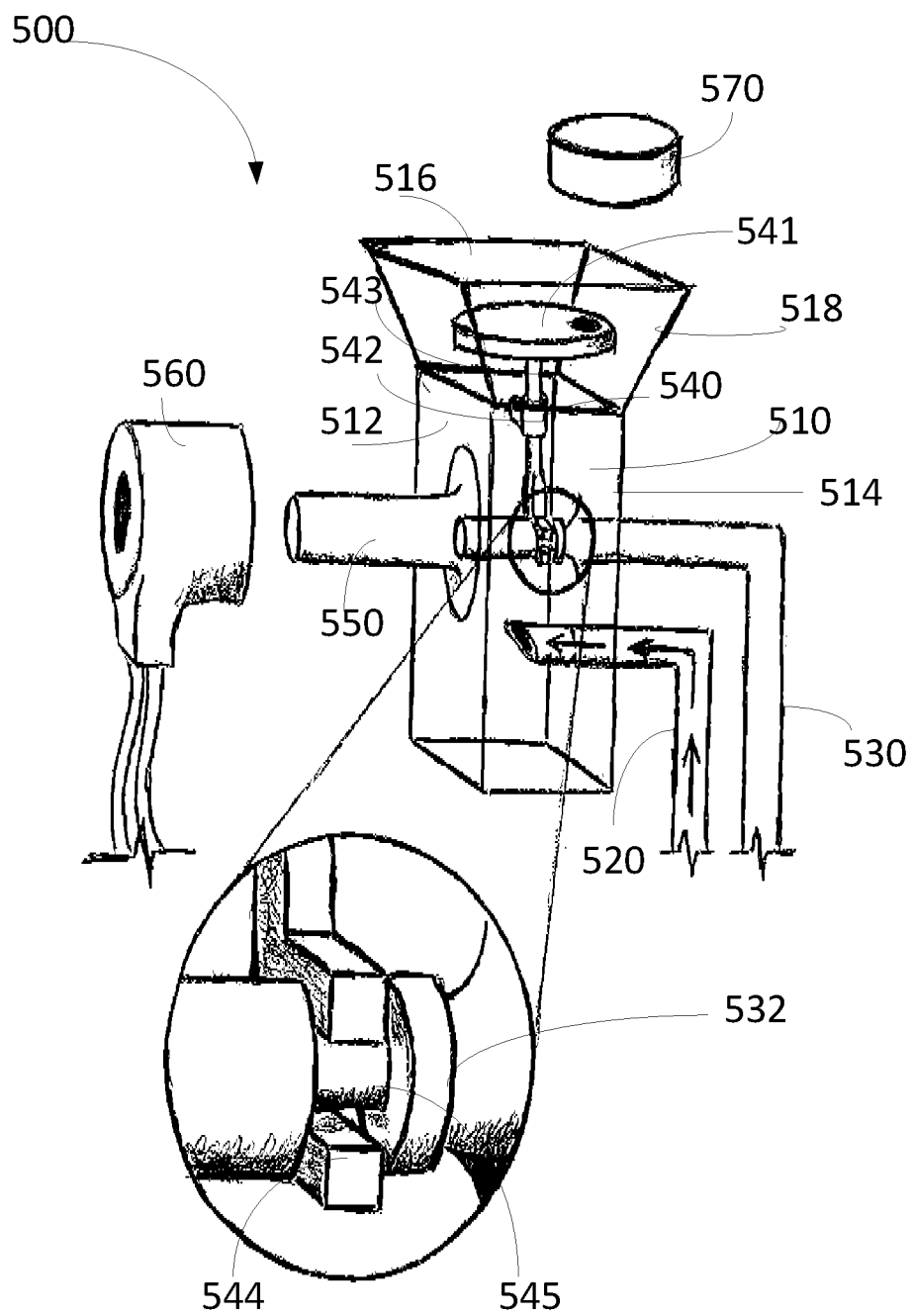
FIG. 5 depicts an embodiment of an in-ground sprinkler system.

FIG. 5 depicts one embodiment of an in-ground sprinkler system 500. In-ground sprinkler system 500 may include a chamber 510, an inlet port 520, an outlet port 530, and internal patch system 540, cavity 550, and solenoid 560. Additionally, FIG. 5 depicts a permanent magnet 570 disposed on an external, top surface of chamber 510, wherein permanent magnet 570 is configured to control the flow rate of liquid through chamber 510.

Chamber 510 may be any receptacle, container, or structure configured to hold a liquid. In embodiments, chamber 510 may be comprised of a non-ferrous material, including rubber, silicone, phthalate-free PVC, plastics, woods, fabrics, etc. Chamber 510 may include first side wall 512, second side wall 514, top surface 516, and control element housing 518. In embodiments, an external face of top surface 516 may be configured to be flush and/or parallel to a top surface of the ground. Top surface 516 may be a unified flat sheet, which does not include projections, indentations, or depressions. Top surface 516 may extend from first side wall 512 to second sidewall 514 in parallel to the surface of the ground.

An internal face of second sidewall 514 may be configured to receive inlet port 520, and outlet port 530. Inlet port 520 may be a tubular in shape with a hollow interior surface. Inlet port 520 may be configured to receive liquid from a feed valve, transport the liquid through the tube, and place the liquid within the interior of chamber 510. In embodiments, inlet port 520 may be comprised of a non-ferrous material, including rubber, silicone, phthalate-free PVC, plastics, woods, fabrics, etc. In embodiments, inlet port 520 may be disposed at a position further away from top surface 516 than outlet port 530. Therefore, if the liquid level in chamber 510 is lower than outlet port 530, liquid will not flow into outlet port 530. In embodiments, inlet port 520 may be configured to extend further into chamber 510 than outlet port 530, such that internal patch system 540 has sufficient space to interface with outlet port 530.

Positioned on second sidewall 514 may also be outlet port 530. Outlet port 530 may be a tubular in shape with a hollow interior surface, and a sealing surface 532 positioned internally within chamber 510. Outlet port 530 may be configured to receive liquid from within chamber 510 at sealing surface 532, transport the liquid through the tube, and output the liquid. Outlet port 530 may be comprised of a non-ferrous material, including rubber, silicone, phthalate-free PVC, plastics, woods, fabrics, etc. In embodiments, outlet port 530 may be configured to extend inwards into chamber 510. Outlet port 130 may extend inwards into chamber 510 so that sealing surface 532 of chamber 510 is not disposed on a sidewall of chamber 510. Furthermore, outlet port 530 may extend inwards into chamber 510 such that sealing surface 532 may receive a portion of internal patch system 540 to cover sealing surface 532. In embodiments, outlet port 530 may be positioned at a position closer to top surface 510 than inlet port 520.

Internal patch system 540 may include metal control element 541, wall coupling member 542, shaft 543, plunger coupling member 544, and plunger 545.

Metal control element 541 may be configured to be disposed in control element housing 518, which may be adjacent to top surface 516 of chamber 510. Metal control element 541 may be cylindrical in shape and configured to rotate within control element housing 518 to control the liquid flow rate through chamber 510. Metal control element 541 may be comprised of metal, such as steel, iron, or any other material that is configured to be moved by a magnet and that will not corrode, rust, deteriorate, etc. when disposed in a liquid. Metal control element 541 may be configured to be positioned internally within chamber 510 in close proximity to top surface 516. In embodiments, metal control element 541 may be configured to be positioned such that an external, permanent magnet 570 positioned on an external surface of top surface 516 may rotate metal control element to uncover plunger 545 from sealing surface 532.

Wall coupling member 542 may be configured to secure shaft 543 in place. Wall coupling member 542 may include an orifice configured to receive shaft 543, such that shaft 543 may extend through the orifice. In embodiments, wall coupling member 543 may be coupled to a sidewall of chamber 510.

A first end of shaft 543 may be coupled to metal control element 541, a middle portion of shaft 543 may be coupled to wall coupling member 542, and a second end of shaft 543 may be configured to interface with plunger 545. Shaft 543 may be comprised a non-ferrous material, including rubber, silicone, phthalate-free PVC, plastics, woods, fabrics, etc. In embodiments, shaft 543 may extend perpendicularly away from metal control element 541 towards a bottom surface of chamber 543. Shaft 543 may be configured to extend through an orifice within wall coupling member 542, such that shaft 543 may be rotated. The second end of shaft 543 may include a concave or U-Shaped interface 544 configured to couple with plunger 545. Concave interface 544 may be configured to have an indentation that is perpendicular to shaft 543. In embodiments, a first projection of concave interface may be configured to be disposed below a portion of plunger 545, and a second projection of concave interface 544 may be configured to be disposed above the portion of plunger 545.

Plunger 545 may be configured to be disposed internally within chamber 510 and coupled with concave interface 544. In embodiments, plunger 545 may be comprised of a ferrous or non-ferrous material, and may be shaped and/or sized to cover sealing surface 532 of outlet port 530. In embodiments, plunger 545 may be configured to be positioned in a direction parallel to the surface of the ground and/or perpendicular to shaft 543.

Plunger 545 may be configured to be disposed in a first position adjacent to sealing surface 532, plunger 545 may be flush against sealing surface 532 and not allow liquid to enter outlet port 530. Plunger 545 may be configured to cover sealing surface 532 without extending into or through sealing surface 532. Therefore, the integrity of sealing surface 532 and outlet port 530 may not be disrupted via controlling water flow through chamber 510, which may reduce leaks.

Figure 6:
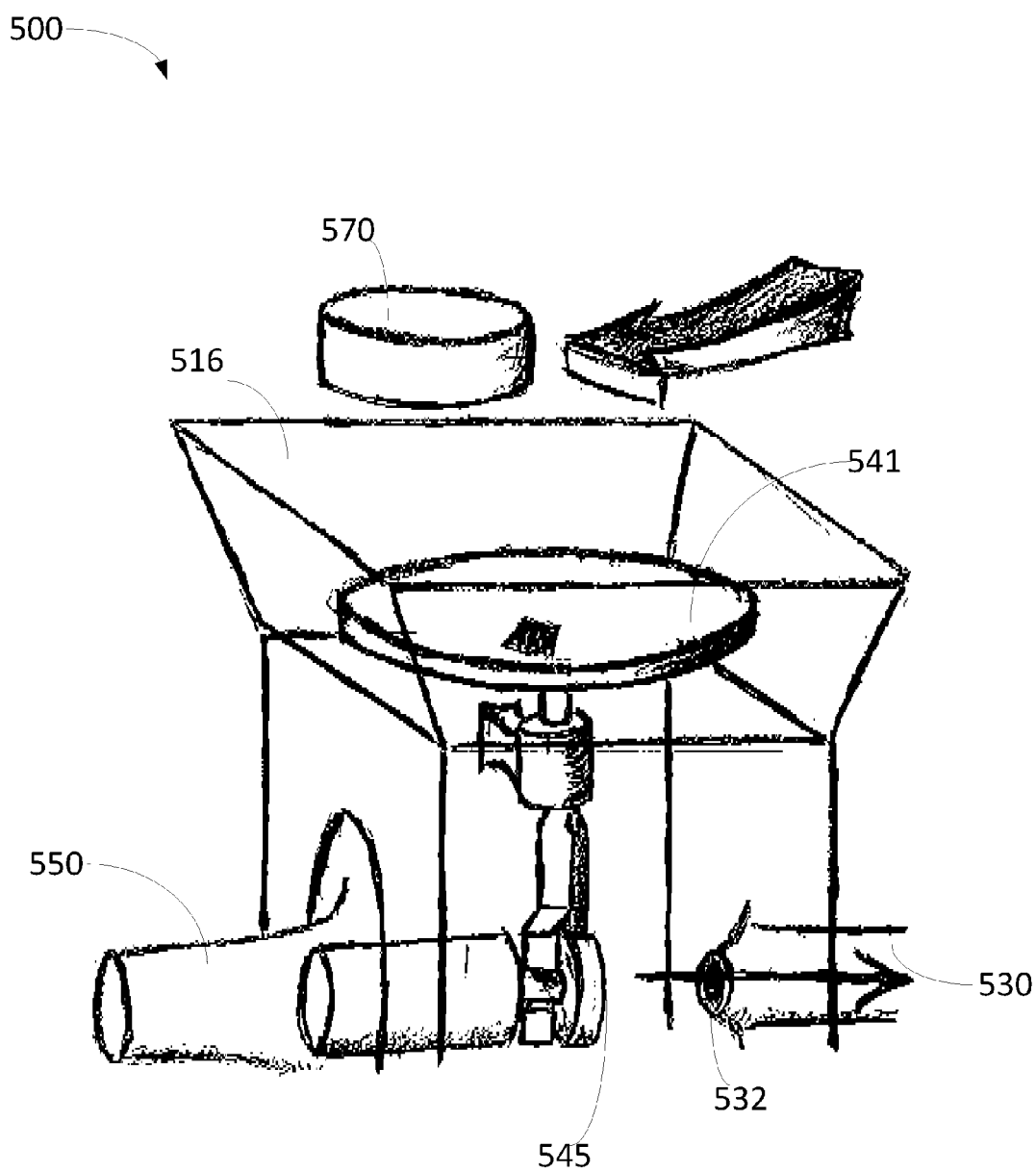
FIG. 6 depicts an embodiment of an in-ground sprinkler system.

As depicted in FIG. 6, plunger 545 may be configured to be controlled by permanent magnet 570 positioned externally from chamber via metal control element 541. In embodiments, if metal control element 541 is rotated, plunger 545 may be configured to be rotated away from internal sealing surface 532 and be placed in a second, allowing liquid within chamber 510 to enter outlet port 530. If plunger 545 is disposed in the second position, a portion of plunger 545 may be configured to be disposed in cavity

550. Cavity 550 may be an orifice disposed on a side wall of chamber 510 that is disposed on first side wall 512, which may be on an opposite side of chamber 510 than second side wall 514. In embodiments, cavity 550 may be coupled with solenoid 560. Solenoid 560 may be configured to encompass cavity 550, such that a projection of cavity 550 may be inserted into solenoid 560.

In other embodiments, solenoid 560 may include a metallic core, which produces a uniform magnetic field. Responsive to receiving electricity, solenoid 560 may be configured to pull or move plunger 560 away from sealing surface 532 and into the second position. In response to not applying electricity to solenoid 560 and removing permanent magnet 570 from top surface 516, the internal liquid pressure within chamber 510 may be configured to move plunger into the first position to cover sealing surface 532. Accordingly, a liquid flow rate within in-ground sprinkler system 500 may be controlled via a permanent magnet 570 disposed on top surface 516 and/or a magnetic field generated by solenoid 560. Therefore, the liquid flow rate through in-ground sprinkler system 500 may be controlled without electricity, without covering an external sealing surface, and without valve stems behind vertically positioned within in-ground sprinkler system 500.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A non-invasive in-ground sprinkler system comprising:
   a passageway including an inlet port configured to receive liquid, and an outlet port configured to disperse the liquid;
   a plunger being positioned within the passageway, a first end of the plunger being to be positioned flush against the outlet port in a first mode, and the first end of the plunger being configured to be positioned away from the outlet port in a second mode;
   a control element configured to move the plunger between the first mode and the second mode;
   a chamber configured to house the passageway, plunger, and control element;
   a removable permanent magnet configured to control the control element based in part on a positioning of the removable permanent magnet on a substantially flat and horizontal upper surface of the chamber, wherein removal of the permanent magnet from a position above the control element does not cause the plunger to move to the first mode, wherein the removable permanent magnet is configured to move in a first plane in parallel to the substantially flat and horizontal upper surface of the chamber to rotate the control element in a second plane in parallel to the substantially flat and horizontal surface of the chamber, wherein the removable permanent magnet is removable from the substantially flat and horizontal upper surface of the chamber.

2. The system of claim 1, further comprising:
   a first sidewall with a cavity, wherein a second end of the plunger is configured to be positioned within the cavity in the second mode; and
   a second sidewall, wherein the outlet port is positioned on the second sidewall.

3. The system of claim 2, further comprising:
   a solenoid encompassing the cavity, the solenoid being configured to move the plunger into the second mode.

4. The system of claim 2, wherein the inlet port is positioned on the second sidewall.

5. The system of claim 4, wherein the cavity is positioned at a same vertical offset as the outlet port, and the outlet port is positioned above the inlet port.

6. The system of claim 1, wherein the control element is cylindrical in shape and configured to rotate.

7. The system of claim 1, further comprising:
   a shaft having a first end being coupled to the control element and having a second end coupled to the plunger, the shaft being comprised of a non-ferrous material.

8. The system of claim 1, wherein responsive to positioning the removable permanent magnet above the control element, the control element is configured to move the plunger from the first mode to the second mode.

9. The system of claim 8, wherein responsive to repositioning the removable permanent magnet above the control element, the control element is configured to move the plunger from the second mode to the first mode.

10. The system of claim 1, wherein the outlet port is configured to extend into the passageway.

11. A method of using a non-invasive in-ground sprinkler system, wherein the system comprising:
    a passageway including an inlet port configured to receive liquid, and an outlet port configured to disperse the liquid;
    a plunger being positioned within the passageway, a first end of the plunger being to be positioned flush against the outlet port in a first mode, and the first end of the plunger being configured to be positioned away from the outlet port in a second mode;
    a control element configured to move the plunger between the first mode and the second mode;
    a chamber configured to house the passageway, plunger, and control element;
    a removable permanent magnet configured to control the control element based in part on a positioning of the removable permanent magnet on a substantially flat and horizontal upper surface of the chamber, wherein removal of the permanent magnet from a position above the control element does not cause the plunger to move to the first mode, wherein the removable permanent magnet is configured to move in a first plane in parallel to the substantially flat and horizontal upper surface of the chamber to rotate the control element in a second plane in parallel to the substantially flat and horizontal surface of the chamber, wherein the removable permanent magnet is removable from the substantially flat and horizontal upper surface of the chamber;
    the method comprising:
    positioning the plunger within the passageway;
    moving, via the control element, the plunger between the first mode and the second mode; and
    controlling the control element via the removable permanent magnet.

12. The method of claim 1, further comprising:
positioning, in the second mode, a second end of the plunger within a cavity on a first sidewall of the passageway;
positioning the outlet port on a second sidewall.

13. The method of claim 12, further comprising:
encompassing the cavity within a solenoid, the solenoid being configured to move the plunger in the second mode.

14. The method of claim 12, wherein the inlet pQ is positioned on the second sidewall.

15. The method of claim 4, wherein the cavity is positioned at a same vertical offset as the outlet port, and the outlet port is positioned above the inlet port.

16. The method of claim 11, wherein the control element is cylindrical in shape; and
rotating the control element.

17. The method of claim 11, further comprising:
coupling a first end of a shaft to the control element, and
coupling a second end of the shaft coupled to the plunger, the shaft being comprised of a non-ferrous material.

18. The method of claim 11, comprising: moving the plunger from the first mode to the second mode responsive to positioning the removable permanent magnet above the control element.

19. The method of claim 18, comprising: moving the plunger from the second mode to the first mode responsive to repositioning the removable permanent magnet above the control element.

20. The method of claim 11, wherein the outlet port is configured to extend into the passageway.

\* \* \* \* \*